J. B. NEIL.
COTTON PICKER.
APPLICATION FILED JULY 20, 1914.

1,223,328.

Patented Apr. 17, 1917.
7 SHEETS—SHEET 1.

Witnesses
J. B. Woody.
M. E. McCarthy.

Joseph B. Neil
Inventor,
by C. A. Snow & Co.
Attorneys.

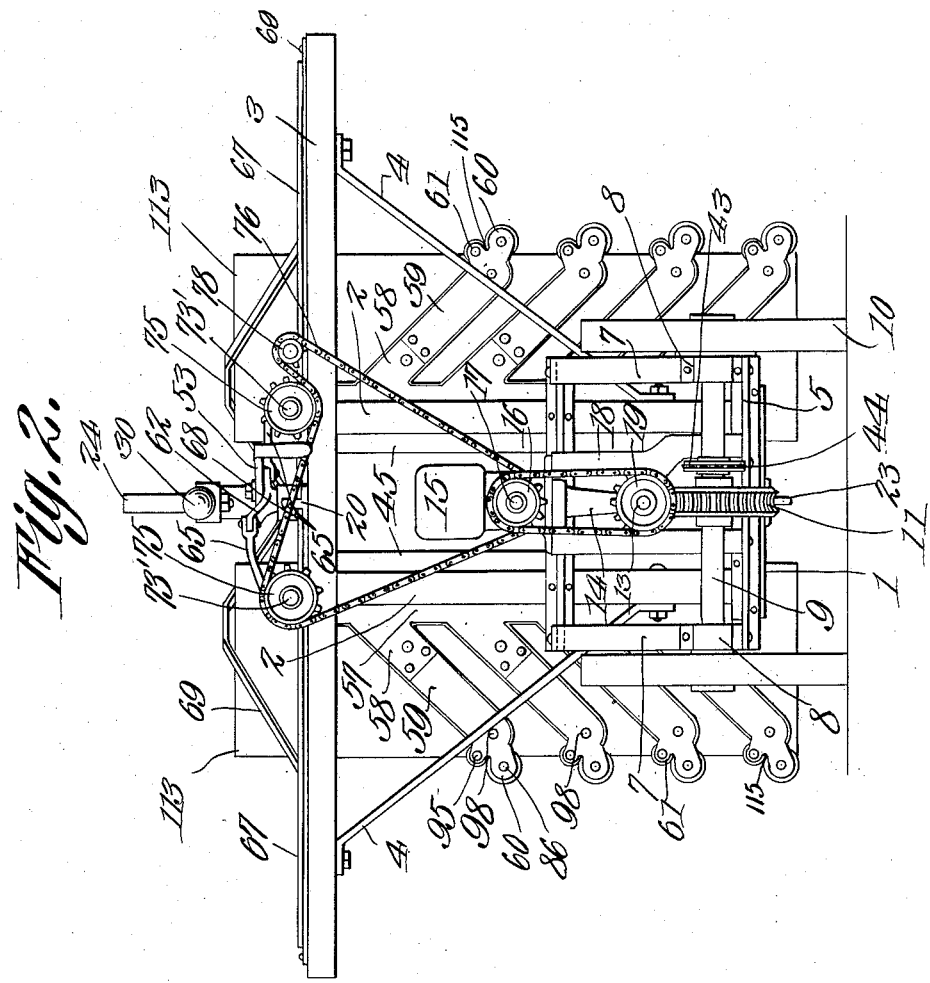

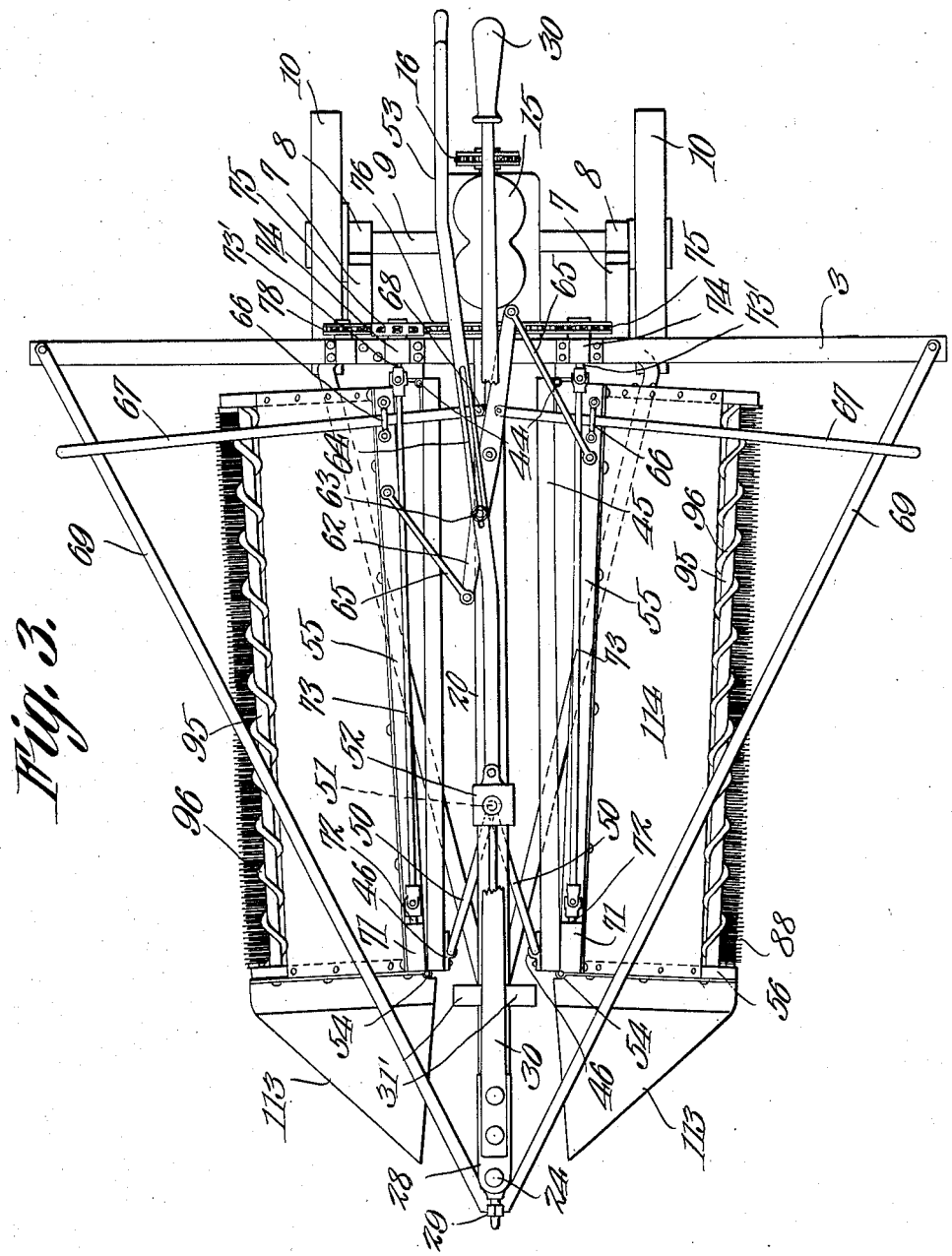

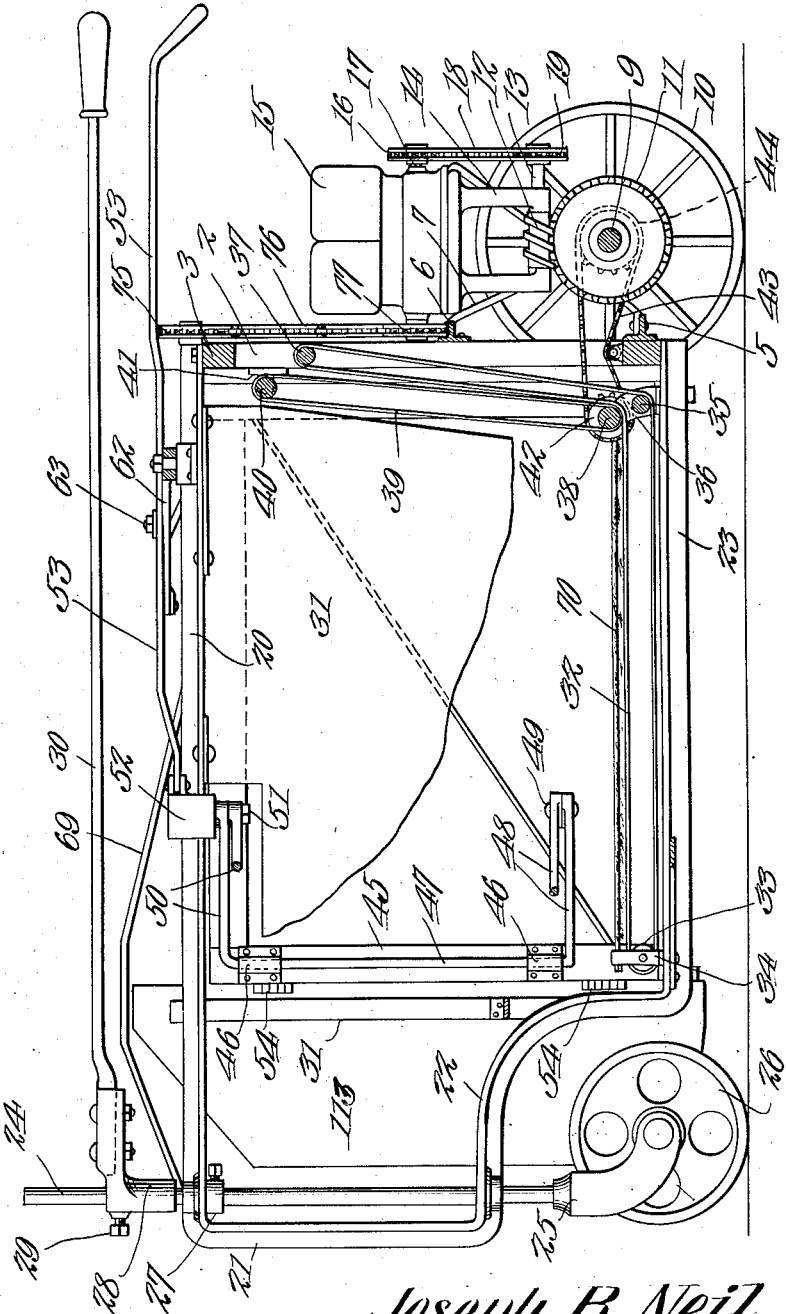

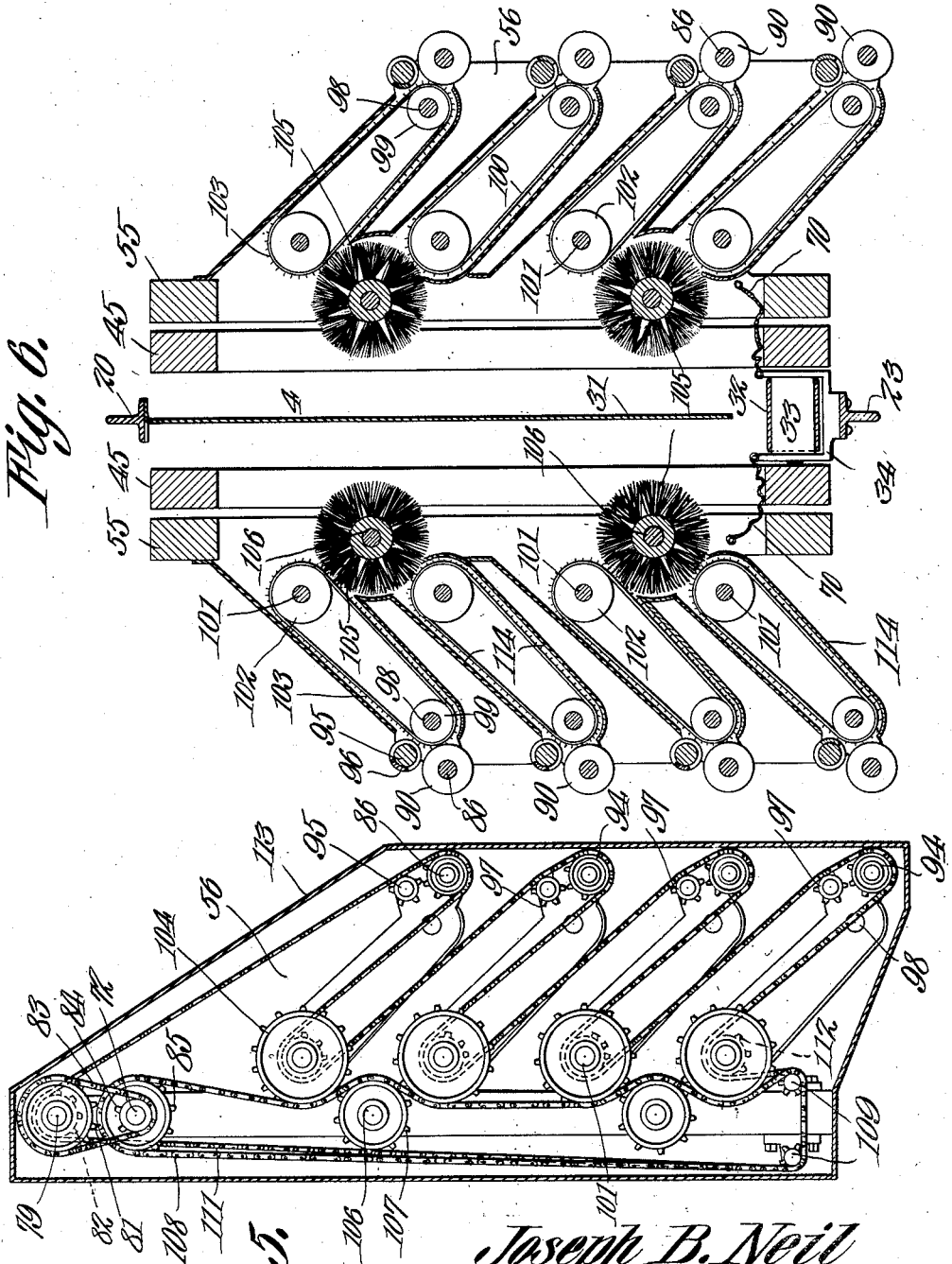

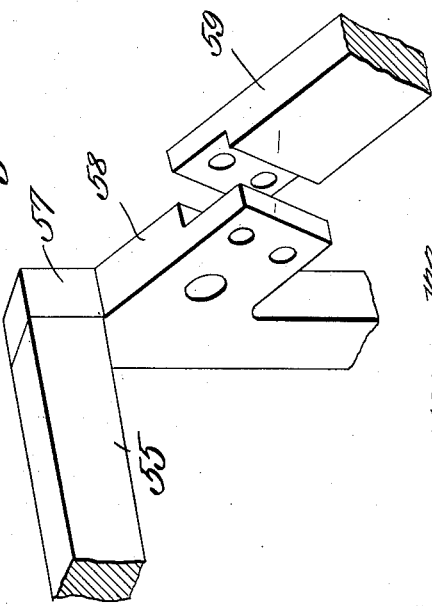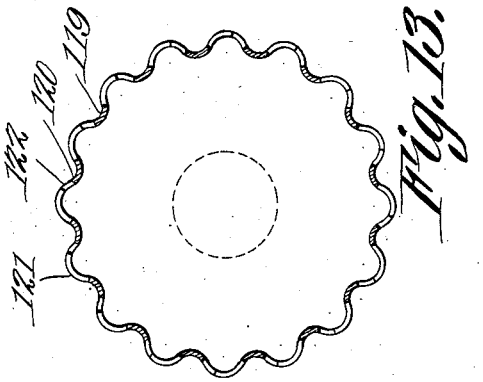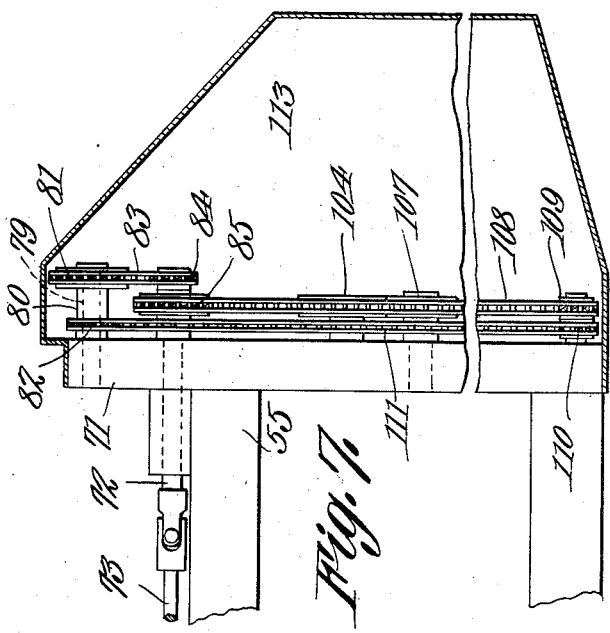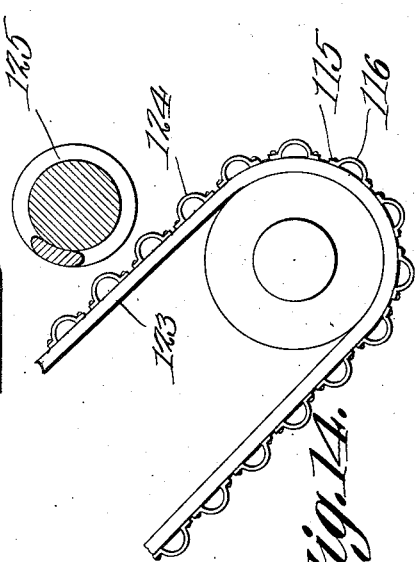

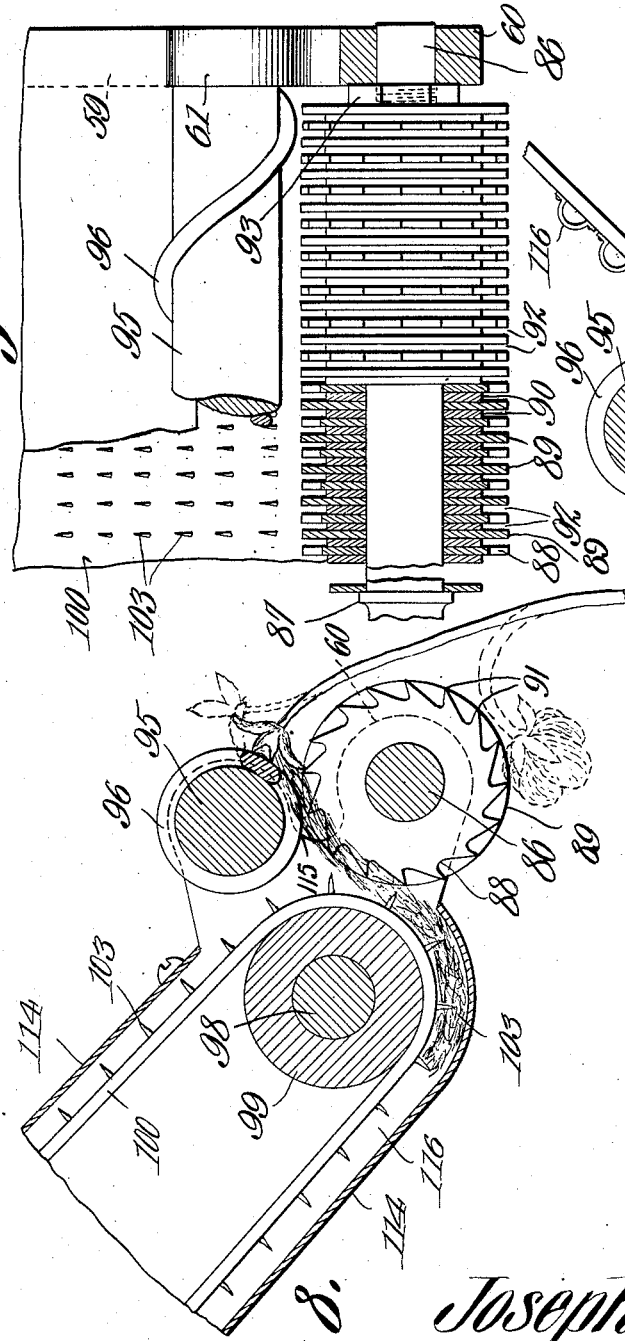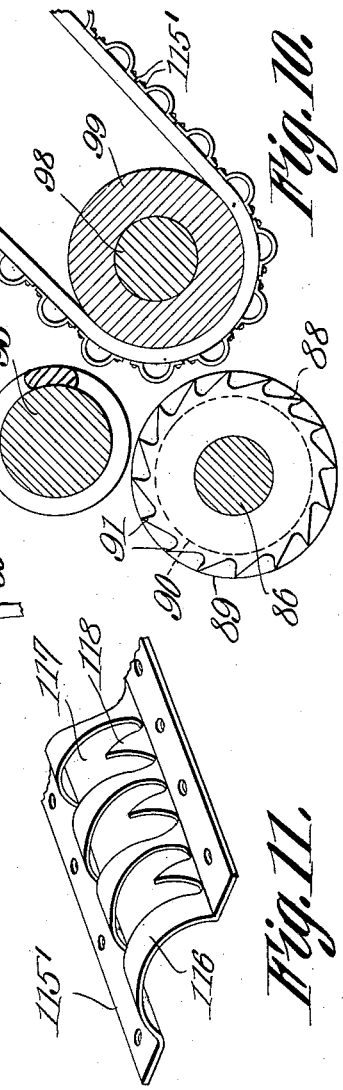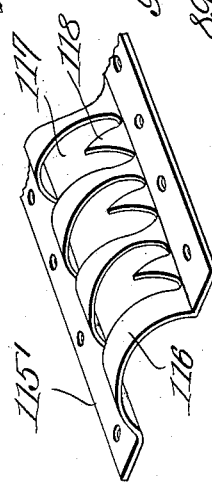

UNITED STATES PATENT OFFICE.

JOSEPH B. NEIL, OF FILBERT, SOUTH CAROLINA, ASSIGNOR TO SOUTH CAROLINA COTTON PICKER CO., OF YORKVILLE, SOUTH CAROLINA.

COTTON-PICKER.

1,223,328.   Specification of Letters Patent.   Patented Apr. 17, 1917.

Application filed July 20, 1914. Serial No. 852,045.

*To all whom it may concern:*

Be it known that I, JOSEPH B. NEIL, a citizen of the United States, residing at Filbert, in the county of York and State of South Carolina, have invented a new and useful Cotton-Picker, of which the following is a specification.

This invention relates to machines for picking cotton, the same being more particularly an improvement upon the structures disclosed in my copending applications filed February 8, 1912, Serial No. 676,426, and filed January 9, 1913, Serial No. 741,058.

The principal object of the present invention is to simplify the mechanism heretofore devised whereby the weight and cost of the machine are materially reduced, the mechanism is less likely to become disarranged, and less power is required for the actuation of the machine.

Another object is to provide novel means for removing the cotton from the picking roll and conveying it to a doffing element.

A further object is to provide cotton conveying means which acts to lift the cotton off of the picking roll without breaking up the cotton lock whereby said lock is delivered practically intact at the discharge end of the machine and not in a broken up condition, as heretofore.

Another object is to provide picking elements mounted for lateral adjustment at both their front and rear ends and for angular adjustment in a vertical plane whereby said picking elements can be adjusted up to the plants and the cotton can be caused to engage one or more of the picking rolls, as desired.

A further object is to combine means with the picking rolls whereby any hulls, leaves or twigs engaged by the picking elements will be flipped out of the machine without being conveyed with the cotton fiber, the conveying means being so positioned relative to the picking means that, should a leaf or other undesirable object be received within the machine, it would fall therefrom and thus be separated from the fiber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Fig. 2 is a rear elevation.

Fig. 3 is a top plan view.

Fig. 4 is a vertical longitudinal section through the machine, showing the conveying and elevating means at the center of the machine, certain parts being broken away.

Fig. 5 is a front elevation of one of the frames of the picking elements and showing the mechanism employed for transmitting motion to the parts carried by the frame.

Fig. 6 is a vertical transverse section through the machine and showing the relative arrangement of the picking, deflecting, conveying, and doffing elements.

Fig. 7 is a vertical section through the cap or housing at the front end of the frame of the picking elements, the upper portion of this frame and cap or housing being shown and a portion of the power transmitting mechanism being illustrated in elevation.

Fig. 8 is an enlarged section through the outer portion of one of the conveyers and the adjacent picking and retarding elements.

Fig. 9 is a view, partly in elevation and partly in section of portions of the structure shown in Fig. 8.

Fig. 10 is a view similar to Fig. 8 but showing a modified form of conveyer.

Fig. 11 is a perspective view of a portion of one of the cotton engaging strips used in connection with the conveyer shown in Fig. 10.

Fig. 12 is perspective view of a portion of the rear end of the frame carrying the picking and conveying elements and showing a portion of a bearing arm detached therefrom.

Fig. 13 is a section through a modified form of picking roll.

Fig. 14 is a section through a modified structure in which the conveying belt constitutes the picking element.

Figure 1:
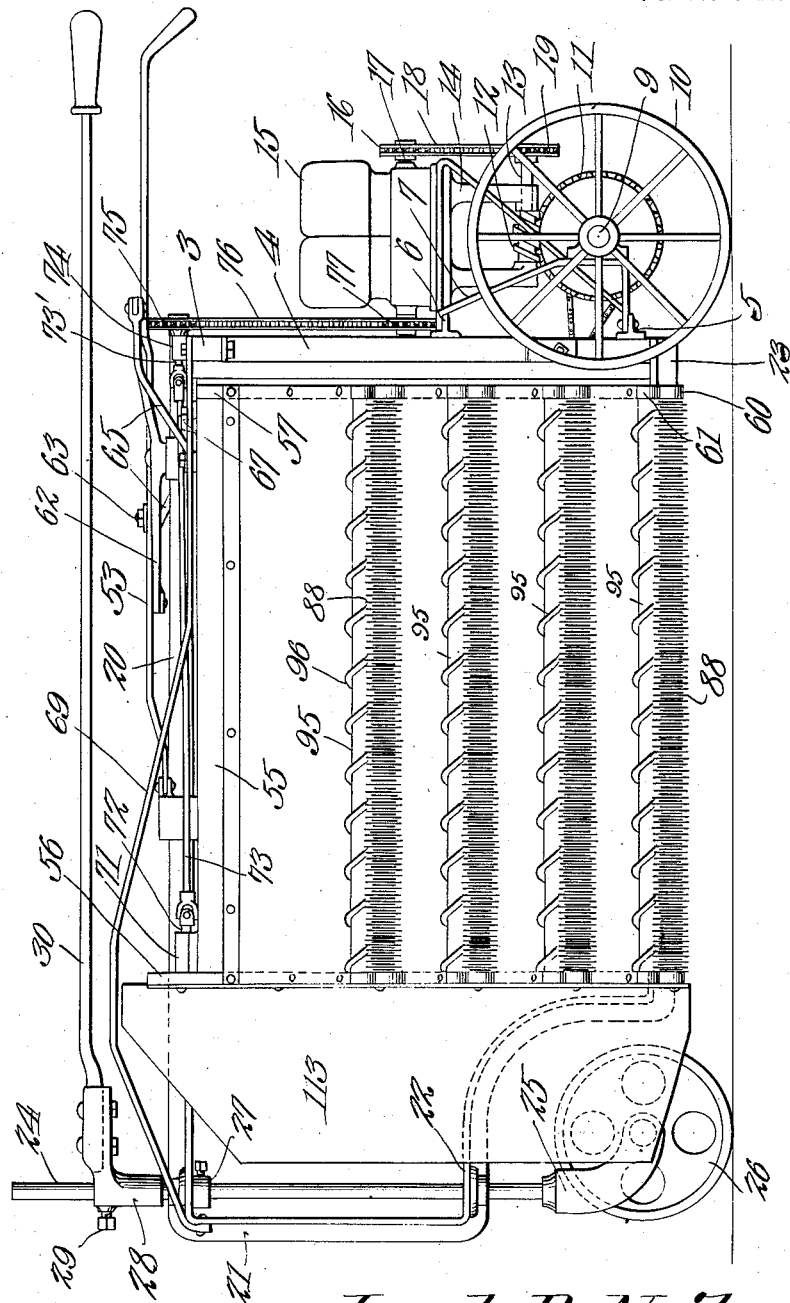
Figure 1 is a side elevation of the machine, the picking elements being shown in horizontal position prior to being tilted for engagement with the cotton plants.

Referring to the figures by characters of reference 1 designates a bottom cross strip having parallel upstanding posts 2 on the upper ends of which is secured a top cross strip 3 connected to the posts by braces 4. These posts and cross strips are preferably formed of wood so that a light main frame is thus provided. Secured longitudinally along the rear face of the strip 1 is a T-iron 5, while a similar T-iron 6 is secured upon the rear faces of the posts 2 at points between the ends thereof, the two T-irons 5 and 6 being parallel and being connected, at their ends, by rearwardly extending brackets 7 provided with bearings 8. The axle 9 of the rear or driving wheels 10 of the machine is journaled in the bearings 8 and has a worm wheel 11 secured thereto. This worm wheel is constantly engaged by a worm 12 secured to a drive shaft 13 which is mounted in suitable bearings 14 located under a motor 15 which, as shown, is supported back of the posts 2. A sprocket 16 is secured to one end of the shaft 17 of the motor and motion is transmitted therefrom through a chain 18 to a sprocket 19 secured to the shaft 13. Thus it will be seen that, during the operation of the motor, motion can be transmitted therefrom to the axle 9 which will be driven at a low speed, it being designed to so proportion and time the parts that the machine will move forward at such a speed as to allow a man to keep up with the machine while walking.

Secured upon the middle portion of the upper cross strip 3 is an upper frame member 20 preferably formed of a T-iron and which extends throughout the length of the machine, the forward end of this frame member extending downwardly and merging into a front upstanding member 21 which, in turn, bends rearwardly and downwardly as at 22 and merges into a bottom frame member 23, the rear end of which extends under and is secured to the middle portion of the strip 1.

A substantially vertical spindle 24 is mounted to slide and rotate within the front end portion of the frame member 20 and the curved portion 22 of the frame, this spindle being provided, at its lower end, with a fork 25 in which is journaled a caster wheel 26. A collar 27 may be adjustably secured to the spindle 24 so as to bear upwardly against the frame member 20 and thus limit the downward movement of said frame member upon the spindle. Obviously by loosening the collar 27, the spindle 24 can be shifted longitudinally relative to the frame member so as thus to raise or lower the front end of the machine relative to the ground.

Secured to the upper end portion of the spindle 24 is a sleeve 28 which can be held in adjusted position by means of a set screw 29 or the like, this sleeve being provided with a rearwardly extending steering lever 30, the rear end of which is located where it can be easily reached and actuated by the operator walking back of the machine.

As shown in the drawings, the forwardly extending main frame made up of the members 20 and 23 and their connection may be braced, adjacent the caster wheel 26, by side strips 31'.

Depending from the frame member 20 is a partition wall 31 formed preferably of sheet metal, this partition extending downwardly close to the upper flight of an endless conveyer 32. This conveyer is mounted upon a front roller 33 journaled in suitable brackets 34 mounted on the front end portion of the member 23. The lower flight of the conveyer is extended under a roller 35 journaled in brackets 36 mounted on the rear portion of the member 23. Said flight is then extended upwardly to a roller 37 journaled between the upper end portions of the posts 2. The upper flight of the conveyer 32 is extended under a roller 38 journaled in the brackets 36 and above the roller 35 and thence upwardly to the roller 37. An endless belt 39 is mounted on the roller 38 between said roller and the upper flight of the conveyer 32, and extends upwardly into engagement with a roller 40 journaled in brackets 41 extending forwardly from the posts 2. The belt 39 and the upwardly extending portion of the conveyer 32 are located back of the partition 31. Roller 38 rotates with a sprocket 42 and this sprocket receives motion, through a sprocket chain 43, from a sprocket 44 secured to the axle 9. Consequently, during the forward movement of the machine, the conveyer 32 will be actuated so that the upper flight thereof will move rearwardly, carrying with it any material resting thereon so that said material will be brought between the belt 39 and the upwardly extending portion of the conveyer 32 and thus elevated to a point above the roller 37 where it will be discharged into a bag or any other receptacle provided therefor.

Connected to each of the posts 2 by means of hinges 44 are inner frames 45 each of which is preferably rectangular and formed of wood so as thus to be light but durable. Bearing blocks 46 are secured to the inner sides of the two frames close to the front ends thereof and are engaged by substantially vertical rods 47 mounted for rotation, these rods being provided, at their lower ends, with radial arms 48 pivotally connected together, as shown at 49 in Fig. 4. Radial arms 50 are provided at the upper ends of the rods 47 and are of the same length as and lie within the same planes with the arms 48. These upper arms 50 are pivotally connected, as shown at 51 and are also pivotally attached to a slide 52 mounted upon the frame member 20. A controlling lever 53 is pivotally connected to the slide and extends rearwardly to a point where it can be reached conveniently by the person walking back of the machine. Obviously by pushing this lever 53 forwardly, the slide 52 will be moved forwardly against the frame member 20 and will thus cause the arms 50 to swing outwardly away from each other, thereby swinging the frames 45 outwardly about their hinges 44.

Connected to the front ends of the frames 45 by means of hinges 54 are picker frames 55. Each of these frames is substantially rectangular and can be made entirely of wood or entirely of metal but in practice it is designed to make the front and rear members of metal while the upper and lower members are to be made of wood connected thereto in any preferred manner. The front member can be provided with an integral laterally extending flange 56 of uniform width and extending throughout the height of the member while the rear member of the frame and which has been indicated at 57 in Fig. 12, is provided, preferably, with laterally and downwardly inclined ears 58, each of which is adapted to be lapped by and secured to an arm 59. These arms 59 are parallel and one of them is provided for each picking unit. As shown particularly in Fig. 2, each arm is provided, at its lower end, with ears 60 and 61, each of said ears constituting a bearing as will be pointed out hereinafter.

Fulcrumed upon the frame member 20 near the rear end thereof is a lever 62 and upstanding from one arm of this lever is a stud 63 slidably mounted within a longitudinal slot 64 formed within the lever 53. One arm of the lever 62 is connected by a link 65 to the rear end portion of one of the picker frames 55 while the other arm of lever 62 is connected by a link 65 to the rear end portion of the other picker frame 55. Thus it will be seen that when lever 53 is swung laterally relative to the frame member 20, it will push or pull upon the stud 63 so as thus to swing lever 62 upon its fulcrum and either pull or push through the links 65 upon the frames 55. Consequently said frames 55 can be caused to swing relative to the inner frames 45 and about the hinges 54.

For the purpose of supporting the rear ends of the frames 45 so that they will not sag to an undesirable extent, each of said picker frames is preferably provided with a strap 66 slidably mounted on supporting strips 67 which are pivotally mounted, as at 68, upon the frame member 20. The outer ends of these strips 67 bear downwardly upon and are adapted to slide on brace strips 69 which converge forwardly from the outer ends of the top strip 3 and are connected to the front end portion of the member 20. Obviously, when the frames 55 are swung laterally away from the frame member 20, the straps 66 will slide along the strips 67 and these strips will, in turn, adjust themselves to the path of movement of the straps 66 by moving forwardly or rearwardly upon the braces 69 and about their pivots 68.

It will be seen that by utilizing a lever 53 such as hereinbefore described, the operator can cause the front ends of the frames 55 to be moved toward and from each other and to cause the rear ends of said frames to swing outwardly or inwardly, thus to bring the outer faces of the picker frames to any desired distances from the frame member 20 and to any desired angles relative to said member.

For the purpose of closing the spaces between the lower portion of the frames 45 and 55 and between the frames 45 and the sides of the conveyer 32, flexible strips 70 are secured at their outer edges within the frames 55 adjacent the lower ends thereof and at their inner edges to the brackets 34 and 36, the inner edges of the strips 70 being stiffened in any suitable manner and being so located as to lie close to the sides of the upper flight of belt 32 as shown particularly in Fig. 6. Thus any material striking the partition 31 and gravitating will either fall upon the belt 32 or upon the flexible strips 70 and will be prevented from falling to the ground. These flexible strips 70 are of such size as not to interfere with the movements of the frames 55 and 45 relative to each other and of the frames 45 relative to the partition 31.

The front end portion of each of the frames 55 is extended upwardly, as shown at 71, thus to constitute a bearing for the front section 72 of a flexible shaft 73. The rear section 73' of the flexible shaft is journaled within a bearing 74 on the top strip 3, it being understood that the sections of the shaft are connected by universal joints which joints have more or less play so that the angular adjustment of the frames 45 and 55 relative to each other and to the partition 31 will not be interfered with. The rear section 73' of each flexible shaft has a sprocket 75 and the two sprockets are engaged by an endless chain 76 which is driven by a sprocket 77 on the front end portion of the motor shaft 17. In order that the two flexible shafts may be rotated simultaneously but in opposite directions respectively, it is necessary for the chain 76 to pass over one of the sprockets 75 and under the other sprocket 75. Consequently an idler sprocket 78 has been provided as shown in Fig. 2. By means of this mechanism it will be seen that the two flexible shafts can be operated continuously irrespective of any angular adjustment of the frames 55 and 45.

Extending forwardly from each upwardly extending portion 71 of each frame 55 is a stud 79 on which is journaled a sleeve 80.

Secured to this sleeve are sprockets 81 and 82, the sprocket 81 receiving motion through a chain 83 from a sprocket 84 secured to the front section 72 of the flexible shaft 73. Another sprocket 85 is secured to the shaft section 72 and is for the purpose hereinafter set forth.

Journaled within each of the ears 60 of arms 59 is the rear end portion of a shaft 86, the front end portion of which is journaled within the flange 56 close to the outer side edge thereof. This shaft is provided, adjacent its front end, with a collar 87 or, if preferred, with a nut screwed onto the shaft and mounted on the shaft is a series of picking disks 88, intermediate spacing disks 89, and side spacing disks 90. As shown in Fig. 8, each of the picking disks is provided with peripheral teeth 91 similar to saw teeth, these teeth being pitched in the direction of rotation and being preferably shaped as illustrated. Interposed between every two adjoining picking disks 88 is an intermediate spacing disk 89 having a smooth periphery, this spacing disk being of the same diameter as the picking disks. Interposed between each intermediate spacing disk 89 and the adjoining picking disks are the side spacing disks 90 each of which is of less diameter than the disks 88 and 89. Consequently annular channels 92 are provided between the disks 88 and the central spacing disks 89.

It is designed to place the various disks 88, 89 and 90 in position on the rod or shaft 86 in the order described and shown and, after a sufficient number of these disks have been placed on the shaft to form a picking roll of the proper length, a nut, shown at 93 can be screwed onto the shaft so as to bind all of the disks together, the collar 87 constituting an abutment. After the disks have thus been secured, it will be seen that there is little chance of relative movement thereof but, instead, all of the parts will rotate together with the shaft 86. Each of the shafts is provided at its front end with a sprocket 94.

A shaft 95 is provided above and parallel with each of the shafts 86, the rear end of each shaft being journaled within one of the ears 61 while the front end of each shaft 95 is journaled within the flange 56 at the front end of the frame 55 and close to the outer side edge of said flange. The shafts 95 carried by each frame 55 are disposed in the same vertical plane, said plane extending slightly back of the vertical plane occupied by shafts 86 on said frame 55. These shafts 95 are provided with spiral ribs 96 extending from one bearing to the other of the shafts, these ribs 96 being so pitched that, during the rotation of the shafts 95, the ribs will exert an upward and backward pressure upon any objects coming into contact therewith. These shafts 95 with their spiral ribs constitute retarding means operating in the manner hereinafter set forth. Each shaft 95 is provided at its front end with a sprocket 97.

Shafts 98 are journaled at their rear ends within the arms 59 and at their front ends within the flange 56 of the frame 55 to which said arms are connected. Each of these shafts 98 is equi-distant from the shafts 86 and 95 associated therewith and is located between the frame 55 and said shafts. Secured to or formed with the shaft 98 is a roller 99 and this roller is engaged by an endless conveying and elevating belt 100 which is located between the inclined planes occupied by the upper and lower faces of the arm 59 in rear of said belt. A shaft 101 is journaled within each of the ears 58 and, at its front end, within the flange 56 of the frame 55. Secured to each of these shafts 101 is a roller 102, this roller being engaged by the endless belt mounted on the adjacent roller 99. Obviously if desired, sprockets can be substituted for the rollers and the belt can be made up of chains for engaging the sprockets. This modification is so obvious that it is not deemed necessary to illustrate the same.

Outstanding from the endless belt are a plurality of sharp pins 103 substantially straight from end to end and the points of which are adapted to work close to the picking roll made up of the disks 88, 89 and 90 without, however, coming into contact with said roll. The front end of each shaft 101 has a sprocket 104.

Each of the picking rolls, its retarding spiral, and its conveyer belt such as herein described, constitutes a single picking unit and in the preferred embodiment of my invention, four superposed units are provided at each side of the machine although it is to be understood that a greater number of units can be employed if desired. A doffing brush 105 is employed in connection with every two adjoining units, this brush being mounted on a shaft 106 journaled within the end portions of the frame 55, the front end of each shaft 106 being provided with a sprocket 107. These sprockets 1 ' are preferably of the same size as the sprockets 85 and project between the sprockets 104 of the shafts 101, the said sprockets 104 being larger than the sprockets 107. An endless chain 108 engages and is actuated by the sprocket 85 and extends downwardly along the front face of the front end member of the frame 55 and under idler sprockets 109. One flight of this chain extends successively into engagement with the sprockets 104 and 107, as shown particularly in Fig. 5, the sprockets 107 serving to hold the chain into engagement with the sprockets 104. In practice it is designed to rotate the sprockets 85 at twelve hundred revolutions per minute and as the sprockets 107 are of the same size as the sprockets 85, the brushes 105 will also make twelve hundred revolutions per minute. The larger sprockets 104, however, are preferably driven nine hundred revolutions per minute.

Arranged back of the idler sprockets 109 are idler sprockets 110 engaged by an endless chain 111 which engages and receives motion from the sprocket 82. One flight of this chain 111 operates to drive the picking and retarding elements of each unit. This flight of the chain 111 passes over an idler sprocket 112 on the lower shaft 101, thence downwardly under the sprocket 94 of the lower picking unit and upwardly over the sprocket 97 of the lower picking unit, after which said flight extends upwardly to another idler sprocket 112 on the shaft 101 of the second picking unit. From this sprocket the said chain extends into engagement with the sprockets 94 and 97 of said second picking unit after which it is extended to the third and fourth picking units as shown in Fig. 5, and thence back to the sprocket 82. The sprockets are so proportioned that during the actuation of the machine, the picking rolls will be driven at approximately six hundred revolutions per minute. The retarding and deflecting elements made up of the spirals are driven at speeds proportionate with the speed of forward movement of the machine so that the said spiral elements will operate to offset any forward drag upon plants which might otherwise occur as a result of engagement with the plants by the machine. In other words, plants engaged by the machine will be kept in substantially upright positions in spite of the frictional engagement therewith by the forwardly moving picking rolls.

In order that the chains and sprockets may be protected from trash and the like, they are all preferably housed within a cap 113 secured to the front of the frame 55, the outer side of the cap being obliquely disposed so as to constitute deflecting means, as shown particularly in Fig. 3. The form and proportions of this cap can be varied of course.

The machine herein described is especially designed to travel between two rows and to remove cotton from the near sides of the plants in said rows. Thus it is distinguished from the straddle row types of cotton pickers heretofore devised, although it is to be understood that the present structure can be readily modified so as to straddle a single row and thus act upon both sides of the row simultaneously.

As has heretofore been pointed out, the machine is designed to move forward at such a speed as to enable the operator to walk in rear thereof while grasping the levers 30 and 53. Before starting the machine, the front end of the frame is adjusted along the spindle 24 so as to raise the front end of the machine and thus support the picking units in downwardly and rearwardly inclined positions. This adjustment is effected when it is desired to work the picking elements downwardly along the stems of the plants from the outer ends of said stems or limbs to the inner or trunk ends thereof. When it is desired to work the picking elements along the limbs of the plants from the inner ends thereof upwardly to the outer or free ends thereof, the front end of the machine is lowered so that the picking elements are thus inclined downwardly and forwardly. Obviously either adjustment can be effected readily by shifting the collar 27 along the spindle 24 in the manner hereinbefore described.

After the machine has been placed between the rows to be acted upon, lever 53 is shifted longitudinally so as thus to move the front ends of the frames 45 toward or from each other in order to bring the front ends of the frames 55 close to but out of contact with the sides of the plants forming the rows. Said lever 53 is then swung laterally so as to swing the rear ends of the frames 55 outwardly into engagement with the plants, it being designed to so adjust these outer side frames 55 that the rear ends of the picking rolls will travel close to the stalks or trunks of the plants. If desired, they can even be so adjusted as to extend slightly back of the trunks or stalks so that as the machine moves forward, the plants will be brushed aside bodily by the picking elements.

Assuming that the picking elements have been adjusted so as to work downwardly along the limbs of the plants from their outer or free ends to their inner or trunk ends, and that the various parts have been set in motion in the manner hereinbefore described, the operation of the machine is as follows:—

The limbs of the plants which extend approximately at 45 degrees to the ground are gradually engaged by the rearwardly diverging sets of picking rollers and these rollers, by reason of the angles at which they are set relative to the ground, will first engage the limbs of the plants close to the outer ends thereof and will gradually work downwardly along the limbs until they brush aside the trunks or stalks of the plants. During this wiping or combing action exerted by the picking rolls, said rolls are being driven at approximately six hundred revolutions per minute and the cotton fiber is brought into engagement with the teeth of the picking rollers and pulled out of the bolls. During this action the retarding elements made up of the shafts 95 and 13 their spiral ribs 96 are pushing rearwardly upon the engaged portions of the plants so as to hold them approximately in their normal or upstanding positions. Should any bur, twig or leaf tend to ride over the picking roller with the cotton fiber, the spiral rib 96 will work thereagainst and push it outwardly away from the fiber so that only the fiber will pass under the spiral with the picking roll. If, by any chance a leaf or the like should fall through the space between the spiral and the picking roller, it will gravitate downwardly between the picking roller and the adjacent portion of the conveying belt, thus falling to the ground. Should a leaf, twig or the like engage the under portion of a picking roller, the teeth of said roller will throw it outwardly away from the machine. It will be noted that, as the teeth of the picking disks do not project beyond the peripheries of the disks 89, it becomes impossible for leaves, twigs, or other objectionable parts to become engaged by the teeth of the picking roller. Only cotton fiber which is capable of pushing into the annular channels 92 will become engaged by the teeth. It will be noted, furthermore, that as the teeth on the picking roller are pulling the cotton out of the bur, the rotating spiral 96 is pushing the bur outwardly and upwardly so that a double pulling action is thus exerted upon the cotton simulating that produced when the fiber is grasped in one hand and the bur in another and the two hands moved apart for the purpose of pulling the cotton out of the bur.

As the cotton fiber is carried back into the machine by the picking roller, the said fiber becomes engaged by the points of the outstanding pins on the conveyer belt during the passage of said pins about the roller 99. As the roller 99 is being driven at approximately nine hundred revolutions per minute, it will be apparent that that portion of the belt moving around the roller will be traveling at the same speed, which is greater than that of the teeth on the picking roller. Consequently the points of the pins upon the conveyer belt 100 will engage the cotton fiber on the picking roller and will lift it off of the teeth and carry the fiber downwardly about the roller 99 and thence upwardly with the lower flight of the belt. As the pins extend outwardly from the belt it will be apparent that where they pass around the roller 99, the points of the pins will travel at a greater speed than the belt and this results in a flipping action of the pins which hook around into cotton fiber on the picking cylinder and lift it from the teeth 91 quickly without, however, tearing the cotton lock. Consequently the cotton lock is conveyed practically intact upwardly by the lower flight of the belt 100 and until it reaches the doffing brush 105. As this doffing brush is rotating at a greater speed than the rollers 102 supporting the adjacent conveyer belts, it will be apparent that the cotton locks will be flipped off of the pins on said belts and thrown inwardly by the brush until they strike the partition 31 after which they will gravitate onto the belt 32 and be conveyed rearwardly and thence upwardly as will be obvious, belt 39 coöperating with the belt 32 for elevating the cotton. The flexible strips 70 will of course prevent the cotton from falling to the ground after being thrown against partition 31 should it fail to fall onto the belt 32.

By referring to the drawings it will be seen that guard plates 114 are secured to the upper and lower faces of the arms 59 and the ears 58 and are also attached to the flange 56. Consequently the conveyer belts 100 are thus housed and not only is trash prevented from falling onto the belts, but any cotton which might be engaged by the pins on the belts will be prevented from falling off of the lower flights of the belts as said cotton is being conveyed upwardly and inwardly toward the doffing brushes. It will be noted furthermore by referring particularly to Figs. 8 and 2 that the arms 59 are provided with deep recesses 115 between the ears 60 and 61. Consequently should any hull, twig or the like come to position between the spiral 96 and the picking roller at a point close to the arm 59, there will be no danger of the same becoming hung on the arm. Instead it would pass through the recess 115.

During the forward movement of the machine the operator can, by manipulating the lever 53, adjust the picking elements outwardly and inwardly and vary the angles thereof, thus to adapt them to plants of different sizes.

It has been found in practice that by propelling a machine such as herein described between the rows from 65 to 90 per cent. of the cotton can be removed from the plants and the plants are left uninjured so that any cotton maturing at a later date can be readily collected by means of the same machine.

Importance is attached to the fact that the mechanism constituting the present invention serves not only to pick the cotton but also to separate therefrom any leaves, burs, twigs or other trash at the time of picking so that only the cotton fiber will be conveyed into the machine and, consequently, a better price can be obtained for the cotton.

It will be understood of course that various changes can be made in the construction of the machine without departing from the principle of the machine heretofore described. For example, and as shown in Fig. 10, instead of providing the conveying and elevating belts with outstanding pins 103, said belts can be provided on their outer or active faces with metallic slats or strips 115' formed with outstruck hollow longitudinal ribs 116 which are arched transversely and provided with slots 117 arranged close together and extending throughout the width of the ribs. Formed within the rear ends of the slots 117 are forwardly extended teeth 118. When a belt is provided such as shown in Fig. 10, the ribs 116 will press against the fibers being carried inwardly and downwardly by the picking rolls and said fibers will press into the slots 117 where they will be engaged by the advancing teeth 118 and lifted off of the teeth of the picking roll. The operation of these conveying belts is practically the same as that of the belts hereinbefore described with the exception that the desirable flipping action produced by the use of outstanding pins and which has been referred to hereinbefore, is not obtained.

Instead of utilizing picking rollers such as hereinbefore described, each roll can be made of a tube as shown at 119 in Fig. 13, the periphery of the tube being formed with longitudinal corrugations 120, each corrugation being arched transversely and provided with slots 121 similar to the slots 117, there being a tooth 122 in one end of each slot, these teeth all pointing in the direction of rotation and being entirely within the slots. These picking rolls will operate practically in the same manner as the picking rolls hereinbefore described but are somewhat more expensive to manufacture. Consequently the first described picking rolls are preferable inasmuch as all of the disks embodied in the construction thereof can be readily stamped from sheet material and then threaded onto the shaft and bound together in the manner hereinbefore pointed out.

In some types of machines, it will be desirable to dispense with the picking rolls and to utilize the conveying belts as the picking means. Such a modified construction has been illustrated generally in Fig. 14. In this figure a picking belt which corresponds with the conveyers 110, has been indicated at 123, this belt being of the same construction as that illustrated in Fig. 10 so that, as it travels in the direction indicated by the arrow in Fig. 14, the advancing teeth within the metal strips 124 will engage the cotton fibers and pull them out of the burs. The rotating spiral 125 will operate in the same manner as spiral 96 hereinbefore described, it serving to hold up the engaged plants and to repel any leaves, twigs, burs or the like which might be adhering to the fibers engaging the conveyer and picker.

By providing the lever 53 and the parts controlled thereby, the adjustment of the frames 55 can be effected very readily, it being possible to shift said frames bodily toward or from each other, or in other words, to shift all portions of the two frames toward or from each other and, it also being possible to shift said frames angularly in lateral directions or, in other words, about upstanding individual axes. These adjustments can be quickly effected during the movement of the machine along a row, thus to adapt it to rows of varying widths and to plants of different sizes.

What is claimed is:—

1. In a cotton picking machine, oppositely disposed frames, means for adjusting the frames bodily toward or from each other, means for adjusting the frames angularly in a lateral direction, parallel superposed picking rolls carried by each frame and extending from front to rear thereof, means adjacent the respective rolls for removing cotton therefrom, and means close to and parallel with each picking roll for engaging cotton plants to maintain them in upstanding positions while the picking rolls are passing the plants and acting upon them.

2. A cotton picking machine including a picker frame, means for adjusting the frame bodily in a lateral direction, means for adjusting the frame angularly in a lateral direction, picking means carried by the frame, and a bur retarding and repelling spiral revolubly mounted close to said picking means and carried by the frame.

3. A cotton picking machine including a wheel supported frame adjustable angularly about a transverse axis, a picker frame carried by said wheel supported frame, means for adjusting the picker frame bodily in a lateral direction, means for adjusting said picker frame angularly in a lateral direction and about an axis extending through one end thereof, a picking roll carried by said frame and extending from front to rear thereof, doffing means coöperating with the roll and carried by the frame, and a revoluble bur retarding and repelling spiral carried by the picker frame and close to and parallel with the picking roll.

4. A cotton picking machine including a wheel supported frame adjustable angularly about a transverse axis to raise or lower one end relative to the ground, opposed picker frames supported by said adjustable frame and adjustable bodily and angularly in a lateral direction relative to each other, superposed revoluble picking rolls carried by the respective picker frames, the rolls of each frame being parallel and extending from the front end to the back end of the picker frame.

5. A cotton picking machine including a wheel supported frame adjustable angularly about a transverse axis to raise or lower one end relative to the ground, opposed picker frames supported by said adjustable frame and adjustable bodily and angularly in a lateral direction relative to each other, superposed revoluble picking rolls carried by the respective picker frames, the rolls of each frame being parallel and extending from the front end to the back end of the picker frame, and a revoluble bur repelling and retarding spiral above and close to each of the picking rolls.

6. A cotton picking machine including a wheel supported frame adjustable about a transverse axis to raise or lower one end of the frame, opposed picker frames carried by said adjustable frame, means for adjusting said picker frames bodily and angularly in lateral directions relative to each other, a drive shaft, superposed picker rolls upon the respective picker frames and extending from front to rear thereof, means adjacent each of the picker rolls for removing cotton therefrom, a revoluble spiral adjacent each of the picker rolls and constituting bur retarding and repelling means, a shaft mounted on each of the picker frames, means for transmitting motion from said shaft to all of the picker rolls, spirals, and cotton removing means on the picker frame, and means for transmitting motion to the shafts on the picker frames from the drive shaft and irrespective of the bodily or angular adjustment of said frames.

7. In a cotton picker, the combination with an endless belt and cotton engaging teeth upon the belt, of a revoluble bur retarding and repelling spiral above and adjacent the belt, and means for doffing cotton from the belt.

8. The combination with a picking roll, of an endless conveyer for removing cotton from the roll, and a bur repelling and retarding spiral revolubly mounted above and parallel with the picking roll and conveyer.

9. A cotton picking machine including a picker frame, means for adjusting the frame bodily in a lateral direction, means for adjusting the frame angularly in a lateral direction, an endless belt inclined upwardly, cotton engaging teeth upon the belt, means supported by the frame for doffing cotton from the belt, and a bur retarding and repelling spiral revolubly mounted above and close to the outer portion of the belt and parallel with the axis of rotation of the belt.

10. A cotton picking machine including a wheel supported frame adjustable angularly about a transverse axis, a picker frame adjustable bodily and anguluarly in a lateral direction relative thereto, an endless inclined belt carried by said picker frame, teeth thereon for engaging cotton fiber, doffing means for removing cotton fiber from the belt, and a revoluble bur retarding and repelling spiral above and close to the outer portion of the belt.

11. A cotton picking machine including a wheel supported frame adjustable angularly about a transverse axis, a picker frame adjustable bodily and angularly in a lateral direction relative thereto, a revoluble picking roll supported by the picker frame, an endless inclined belt extending close to the picker roll.

12. A cotton picking machine including a wheel supported frame adjustable angularly about a transverse axis, a picker frame adjustable bodily and angularly in a lateral direction relative thereto, a revoluble picking roll supported by the picker frame, an endless inclined belt extending close to the picking roll, and means for doffing cotton from the belt.

13. A cotton picking machine including a wheel supported frame adjustable angularly about a transverse axis, a picker frame adjustable bodily and angularly in a lateral direction relative thereto, a revoluble picking roll supported by the picker frame, an endless inclined belt extending close to the picking roll, a repelling and bur retarding spiral revolubly mounted above and close to the picking roll and parallel therewith.

14. A cotton picking machine including a wheel supported frame adjustable angularly about a transverse axis, a picker frame adjustable bodily and angularly in a lateral direction relative thereto, a revoluble picking roll supported by the picker frame, an endless inclined belt extending close to the picking roll, a bur repelling and retarding spiral revolubly mounted above and close to the picking roll and parallel therewith, and a doffing element for removing cotton from the belt.

15. A cotton picker including a wheel supported frame, means for angularly adjusting said frame about a transverse axis, a picker frame adjustable bodily and angularly relative to the wheel supported frame in a lateral direction, superposed picker rolls supported by said picker frame, parallel upwardly inclined endless belts extending from points adjacent the rolls, means upon said belts for engaging cotton and lifting it from the picker rolls, revoluble bur repelling and retarding spirals above and parallel with the picker rolls and the outer portions of the belts, and a doffing brush interposed between every two belts for removing cotton therefrom.

16. The combination with a wheel supported frame and means for adjusting said frame angularly about a transverse axis, of a picker frame adjustable bodily and angularly relative to the wheel supported frame in a lateral direction, a rear conveyer carried by the wheel supported frame, a picking roll carried by the picker frame, a combined bur retarding and repelling spirial revolubly mounted above and close to the picking roll, and means for stripping cotton from the picking roll and conveying it to a point above the conveyer, and means for doffing cotton from said conveying means and directing it onto the first named conveyer.

17. A cotton picking machine including opposed series of picking units, said series converging toward one end of the machine, each unit including a picking roll extending from front to rear of the unit, an endless conveying belt extending from front to rear of said unit and inclined upwardly away from the engaged plants, and a bur retarding and repelling spiral revolubly mounted above and close to the picking roll and the belt.

18. A cotton picking machine including a wheel supported frame, means for adjusting said frame angularly about a transverse axis, opposed series of picking units supported by the frame, said series being adjustable angularly about substantially vertical axes and relative to the wheel supported frame, each of said units including a picking roll, an upwardly inclined conveying belt for stripping cotton from the picking roll, and a combined bur retarding and repelling spiral revolubly mounted above and close to the picking roll.

19. In a cotton picker, the combination with a wheel supported frame, a combined conveyer and elevator carried thereby, and a deflecting partition supported above said conveyer, of opposed series of picking units, each unit including a cotton engaging conveyer, spiral bur retarding and repelling elements revolubly mounted adjacent the outer portions of the conveyers, and means for doffing cotton from the conveyers and directing it against the partition, said partition being extended between the series of picking units.

20. A cotton picking machine including opposed series of picking units adjustable angularly in lateral directions, each of said picking units including an endless belt extending upwardly and inwardly toward the opposed series of units, teeth upon the belt for engaging cotton fiber, and a spiral bur retarding and repelling element revolubly mounted above and adjacent the outer end of the belt, doffing means for removing cotton from the belt, a partition interposed between the series of picking units and constituting an abutment for the cotton removed by the doffing elements, and a conveyer for receiving the cotton gravitating from the partition.

21. A cotton picking machine including opposed series of picking units adjustable angularly in lateral directions, each of said picking units including an endless belt extending upwardly and inwardly toward the opposed series of units, teeth upon the belt for engaging cotton fiber, and a spiral bur retarding and repelling element revolubly mounted above and adjacent the outer end of the belt, doffing means for removing cotton from the belt, a partition interposed between the series of picking units and constituting an abutment for the cotton removed by the doffing elements, and a conveyer for receiving the cotton gravitating from the partition, each of said series of picking units being adjustable angularly about an axis extending transversely of the machine.

22. A cotton picking machine including opposed series of picking units, the units of each series being superposed and each of said units including a picking roll, an endless belt inclined upwardly and inwardly away from the roll, teeth upon the belt for engaging cotton and removing it from the roll, a revoluble spiral above each roll and its belt, said spiral constituting bur retarding and repelling means, a partition interposed between the series of units, and doffing means for directing cotton from the belts and against the partition.

23. A cotton picking machine including opposed series of picking units, the units of each series being superposed and each of said units including a picking roll, an endless belt inclined upwardly and inwardly away from the roll, teeth upon the belt for engaging cotton and removing it from the roll, a revoluble spiral above each roll and its belt, said spiral constituting bur retarding and repelling means, means for doffing cotton from the belts, and combined conveying and elevating means interposed between the series of units for receiving the cotton doffed from the belts.

In testimony that I claim the foregoing as my own, I have hereto affixed my signature in the presence of two witnesses.

JOSEPH B. NEIL.

Witnesses:
 O. E. WILKINS,
 ARTHUR T. HART.